3,295,358
METHOD AND APPARATUS FOR DETERMINING THE THERMAL EXPANSION OF MATERIALS
Dietmar Boenisch, Haselsteig 11, Aachen, Germany
Filed June 15, 1964, Ser. No. 375,392
Claims priority, application Germany, June 21, 1963,
B 72,363
17 Claims. (Cl. 73—16)

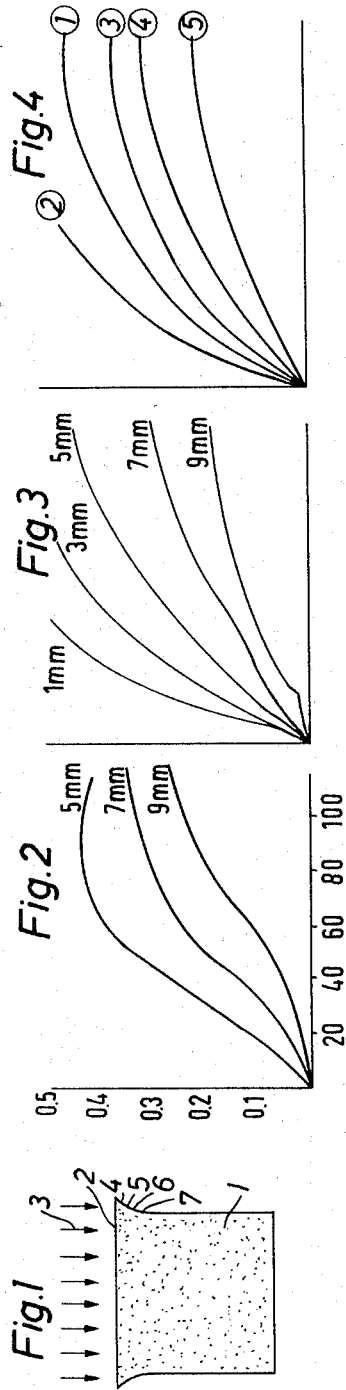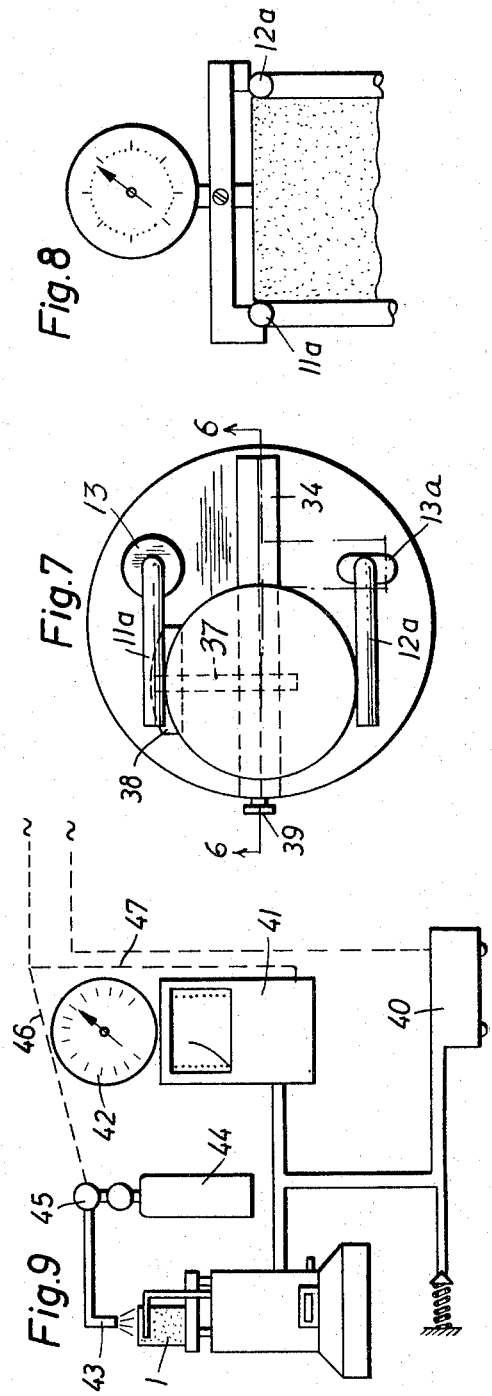

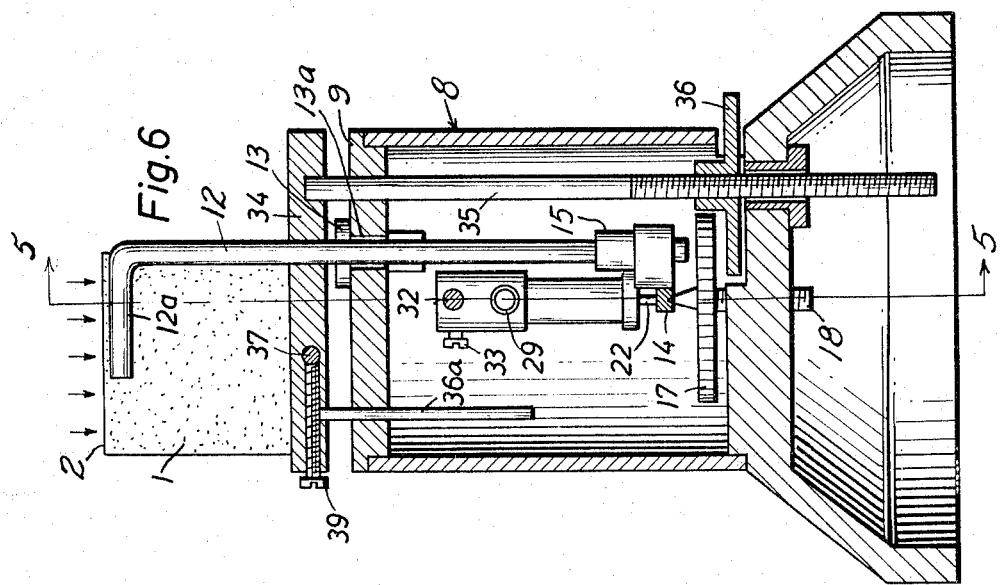
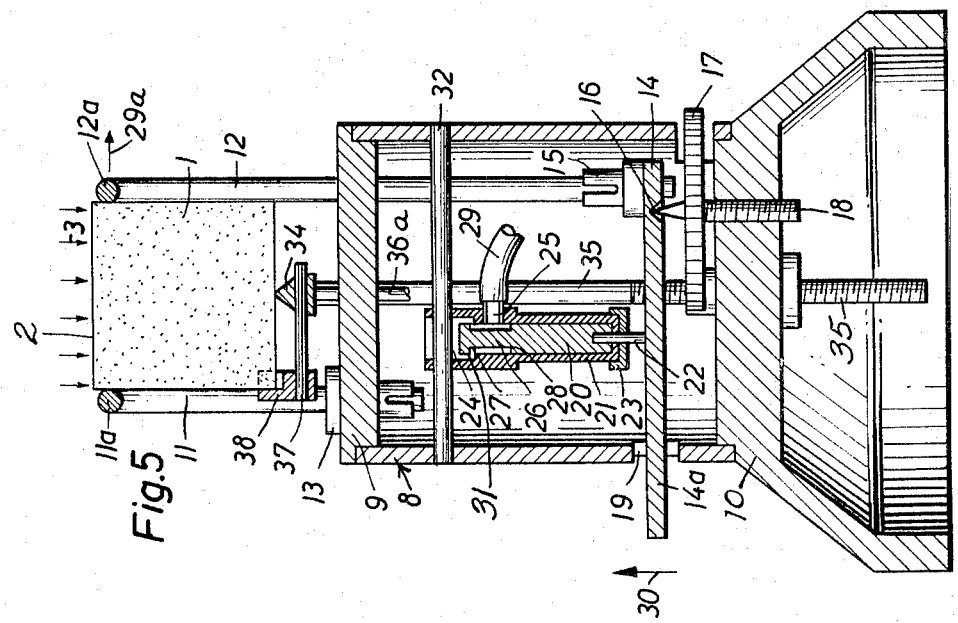

The expansion of a mold material used for the preparation of molds and cores in foundries and also other refractory building materials, for example for lining of melting ovens and casting ladles or the like, is primarily dependent on the minerals used, and is also determined through further additives considered often as necessary. Thus different influences are exercised by the grain size of the sand, the type and amount of binder, the strength of the binder under casting heat, the preparation condition and the degree of compaction of the mold mixture, the different molding sand additives, the moisture content and other factors. Since quartz sands of determined particle size are predominantly used for preparation of molds and cores, for many years particular attention has been given to the expansion of the sand. With different types of testing apparatus the linear and cubic expansion of bound and unbound molding sands have been measured in an effort to estimate the expansion behavior of molds and cores being used in the casting process. Prior measuring methods and apparatus usually have worked with cylindrical test specimens, which as a rule are formed either solid or with an axially running bore. These test specimens are placed on an end face in a measuring apparatus and, with strong homogeneous heating from all sides, the amount of the change in length with or without pre-loading is measured. Also there are measuring methods of the described type in which the expansion is suppressed and the force necessary therefor is measured. For this type of measurement, in many cases the test specimen is surrounded by a tube through which radial expansion is largely suppressed. Confining the test specimen in a tube also thereby prevents the escape of molding sand volatile constituents during the measurement; but is disadvantageous because natural expansions, which likewise are of influence upon the measured value, are suppressed.

The hitherto used electrical heating penetrating from all sides to the core of test sepcimens for the usual measurements requires a long time, on the average amounting to from 5 to 10 minutes. With that thorough heating the temperature gradient is small, and during the long heating time many molding sand additives are prematurely destroyed, so that their real influence in the mold cannot be established. Among such additives for example are included coal dust, tar pitch, dextrin, swellable binders, artificial resin and powdered peat.

To overcome these disadvantages it has also been proposed to heat a test specimen within a short time of about 1 to 2 minutes, up to a temperature as high as 1000° C. and higher, in an electrical field; a high frequency alternating electrical field providing a heat source which heats up every sand grain individually, so that the heating is achieved relatively rapidly and without any noteworthy temperature gradient and consequently approximately homogeneously. This type of test apparatus is extremely complicated, expensive and therefore in practice unsuited for mass production or for the frequently rough foundry operation. Previous test procedures have the disadvantage, that they all proceed with only a relatively small or no heat gradient; and a further disadvantage appears by the fact that for measurement of expansion the testing device is applied to the entire relatively large face surface of the specimen, whereby a perhaps different increase of the individual sand layers, as a consequence of a slight temperature gradient that may be present, cannot be separately apprehended.

The present invention proceeds with the purpose of overcoming the disadvantages of previous test methods and apparatuses and of providing a method as well as an apparatus permitting a testing in the laboratory which corresponds to or considerably approximates the conditions of the molding materials under casting heat. To that end, for determining the thermal expansion of industrial materials, in particular highly heated molding sands and cores compacted or otherwise firmed, as well as other refractory construction materials, in accordance with the invention it is proposed that the test specimen be held in a manner permitting unhindered expansion thereof and strong heating from one side, and that the amount of expansion of the heated zone be measured in comparison to less heated or unheated zones.

In accordance with the present invention, there is purposely sought and obtained a very sharp temperature gradient. The invention is based on the knowledge that the expansion of a molding material, in which no or only a slight thermal gradient is present, is essentially other than in a mold material with a sharp temperature gradient and hence also stress gradient. In accordance with the proposal of the invention, the expansion measured is not that in a uniformly heated specimen, but rather the expansion of a heated molding sand surface layer, which is bound to the relatively cool sand under-base and is restrained in expansion through the latter. The expansion of a mold material upon heating of the surface with a sharp temperature gradient in the mold materials is not to be considered as a consequence merely of the expansion of the individual sand grains, because the highly heated surface layer indeed expands, but normally to a much smaller degree than in the case of uniform heating of the entire specimen. In other words, the expansion of the surface, the region of interest, which stands in contact with the cast metal through heat radiation or heat conduction, is restrained through the strength in the substrate sand. In accordance with the invention therefore are measured the mutual effects between the expansion of the highly heated surface layer and the strength of the less heated or unheated layers lying thereunder. With strong expansion of the surface layer and slight strength of the layers lying thereunder, the surface in the limiting case will spall or crack off and correspondingly, as a consequence of the sand fault, a fault in the casting arises. With lesser expansions of the surface layer in relation to the less heated deeper lying layers, the cohesion of the differently heated layers is maintained. In accordance with a fundamental concept of the invention, no sand expansion faults then arise, if despite the strong expansion of the higher heated surface layer the strength of the substrate is sufficiently high.

The proposal in accordance with the invention also permits ascertaining the effect of different molding sand additives upon the expansion, strength and deformability or yieldability which have a reciprocal effect on each other. Hence the possibility of learning the failure tendency in a casting mold through a simple laboratory investigation, without use of a cast metal.

It has been known, that in addition to a sufficiently high strength a larger yieldability of the sand in the substrate is of great importance. Through the expansion of the surface layer, the surface layer and substrate in practice are drawn from one another and therefore particularly subjected to tension and shearing. Despite lesser strength, sand faults also can be avoided through a greater yieldability in the substrate or base sand.

In order to be able to measure the relative displacement of individual layers or sand grain positions relative to one another for ascertaining the yieldability, it is further proposed in accordance with the invention that the amount of the expansion be measured at different distances from the heated surface. To enable a quantitative comparison of the expansion of a mold material at different distances from the heated surface, it is further proposed to register the test values continually in a chart recorder, such as an air pressure responsive recorder, beginning all tests at the same starting point of the recorder, whereby the resulting group of curves for the several specimens have a common origin. Thereby from the curve or directions the movement of the sand layers relative to one another can be determined and conclusions may be drawn about the yieldability of the base sand. Also the one-sided heating of the test sample and the operation of the air pressure recorder are begun simultaneously.

As a test specimen by this invention is proposed a per se known cylindrical body, of which an end face is heated with the radially directed expansion being transmitted to a pointed probe or sensor applied to the cylindrical external surface, and the displacement of the probe is measured. It is further proposed that the test specimen be engaged by a similar pointed support element disposed opposite the probe at a like height and that quartz rods be used as the material for the support and the probe. The excursion of the probe then in a further embodiment of the invention is transmitted through a lever rod to a valve which is continually supplied with an air stream, wherein the change of air pressure, arising in consequence of the valve air flow cross section effective for escape of the air as established through the probe, is recorded on an air pressure recorder having a chart paper advancing means.

The curves obtained for evaluating different molding sands or refractory materials by the method of operation in accordance with the invention as well as an apparatus for carrying out the method are shown in and described in detail with respect to the drawings. The drawings in combination with the hereinafter given description are merely representative of one example of carrying out the invention and are not to be considered as limiting the invention. Furthermore, there are additional variations possible in the scope of the general inventive concept.

Other objects and advantages will appear from the following description and the drawings wherein:

FIG. 1 is a cylindrical solid specimen with arrows indicating heating of the surface with the radial expansion exaggerated for clarity of the drawing;

FIG. 2 is a set of recorder-traced curves showing the expansion of a sand, with a synthetic resin binder, in differing thickness by measurements at a 3 mm. depth below the heated surface;

FIG. 3 is a set of curves similar to FIG. 1 for a wet sand with bentonite binder, but with expansion measured at different depths below the heated surface;

FIG. 4 is another similar set of curves for a wet bentonite bound sand, provided however with different additive materials, with the expansion measured at a constant like depth of 5 mm. beneath the heated surface;

FIG. 5 shows a test device in a generally vertical section taken substantially as indicated by the line 5—5 in FIG. 6;

FIG. 6 is another generally vertical section of the device taken substantially as indicated by the irregular line 6—6 in FIG. 7;

FIG. 7 is a top view of the device;

FIG. 8 is a fragmentary view showing a measuring gauge in place on the apparatus for adjustment of the measuring position to a desired depth beneath the top surface of the specimen; and FIG. 9 is a generalized, schematic overall view of the test apparatus, showing the device having associated therewith an air pressure responsive recorder, manometer, electrical pump, gas burner and fuel supply.

FIG. 1 shows a vertical section through an upright test specimen 1, cylindrical before heating, of a compacted mold material used for the preparation of casting molds. The specimen is heated on its upper face 2 by radiant heating rays indicated by arrows 3. The heated top surface layer expands radially outwardly, the extent of the expansion for different measuring points 4, 5, 6 and 7 at different distances from the surface decreasing with increasing depth, as does the temperature. On the whole, however, since through a rapid heating only a layer up to 10 mm. is heated, the temperature gradient is quite high between the single levels and in particularly between the body as a whole and the highly heated surface.

In the FIGS. 2 to 4, having like units of measurement, the abscissa indicates the heating time in seconds and the ordinate the linear expansion in fractions of a millimeter.

FIG. 2 shows the expansion of a synthetic resin bound sand and the effect of thickness of the specimen upon the expansion. Three different discs were used of 5 mm., 7 mm. and 10 mm. thickness with a diameter of 5 cm. The measuring spot in all samples lay 3 mm. beneath the heated surface. Other depths beneath the surface can of course be selected. The disc of a thickness of 5 mm. expands much more strongly than the 7 mm. thick and the 10 mm. thick disc. The reason for this is because the restraint on the expansion increases with increasing thickness of the disc.

FIG. 3 shows different curves obtained with a wet bentonite bound sand in a five by five (5 x 5) cm. large standard test specimen, prepared in accordance with Deutsch Industrie Normal, DIN 52401. Each curve was obtained with a new test specimen, used only for a single measurement. The depths beneath the surface of the measurement places are given adjacent the respective curves. From FIG. 3 it is to be seen that the surface layer, extending only a millimeter beneath the heated surface, expands very strongly and quite quickly, and practically draws along with it the substrate or base sand which occurs 3 mm. below the surface. Also the other levels or layers which lie 5 mm., 7 mm. and 9 mm. beneath the surface are drawn along although the expansion in the last measured layers is small.

The curves in FIG. 4 represent a sand such as that of FIG. 3, but including different molding sand additives usual in practice. Here in contrast to FIG. 3, the test point for all curves lies uniformly at 5 mm. beneath the surface of a test specimen as represented in FIG. 1. Curve No. 1 had no additive. Curve No. 2 was obtained with a 10% addition of quartz meal, which is seen to increase the expansion. Curve 3 shows the favorable expansion-decreasing addition of 5% of coal dust having 10% volatile components, while Curve No. 4 evidences the effect of an addition of 1% wood sawdust. Curve No. 5 shows the effect of a 5% coal dust addition having however 35% volatile components. Comparison of the coal dust addition Curves 3 and 5 shows that a coal dust with a high content of volatile components is very favorable. The smaller the expansion is of the surface, so much favorably does a molding sand behave in practice.

The differences in the curves represented in FIGS. 3 and 4 are also in principle to be obtained with other mold materials, for example, also with $CO_2$ sands, artificial resin bound sands, cupola oven tamping mass or caulking materials or like materials. The method in accordance with the invention is likewise suitable to reveal the effect on expansion changes of black washing or blacking the surface. As known, in the case of black washing or blacking the important problem is the adhesion of these coatings on the surface of the mold under casting heat or a change of expansion of a surface layer. To determine the effect of these black washes and blackings, test specimens can be compared with one another with and without black washes and blacking; and conclusions then can be drawn from the differences of the expansion curves.

FIG. 5 shows a section, as viewed from the front, of a test device, known as a dilatometer, comprised of including a housing or chamber 8, a cover 9 and a housing base or pedestal 10. The expansion measurement is obtained by inserting the specimen 1 between a backing support 11 and a movable sensor or measuring probe 12, each comprised of a quartz glass rod formed with a right angle bend respectively 11a, 12a. The support element is secured in the housing cover 9 through a mounting device 13 in the form of a friction collar. The support and the probe, as is very clearly shown in FIG. 7, are applied tangentially on the external circumference of the cylindrical test specimen 1 and likewise, as is evident from FIG. 5, at the same height, that is, at a like distance beneath the heated surface 2 of the test specimen.

The probe 12 extends through an elongated opening 13a of the cover 9 into the housing and is secured through a friction coupling collar 15 or a like securing element, on the end of a double armed measuring beam 14, 14a formed as a balance tippably supported on a point bearing or fulcrum 16 through an adjustment wheel 17. The latter, having a part of its circumference projecting out of the housing 8, has a spindle 18 threaded into base 10 and is raised and lowered in the housing 8 through wheel rotation. On the beam portion 14a, which extends exteriorly through an elongated housing slit 19, there rests a piston 20 vertically slideably supported in a valve housing 21 and having its actual bearing on beam 14 through its pin 22 slideably engaged through a bottom cover 23 of the valve housing. The top however opens to the exterior through chamber 24 in the form of a counter-bore. The piston 20 at the height of an air supply tubing connector nipple 25 has a circumferential flat bottomed groove 26 of uniform depth defining two super-imposed or vertically spaced piston surfaces 27 and 28 of like size. Thereby upon the piston surfaces 27, 28 there acts in opposite senses an equal air pressure supplied through the base line 29 and connector 25.

Upon heating of the specimen surface 2, the probe 12d is displaced in the indicated arrow direction 29a through the expansion represented in exaggerated manner in FIG. 1, and correspondingly the beam portion 14d is lifted in the indicated arrow direction 30. Thereby also the piston 20, which under its own intrinsic weight contacts the measuring beam through the pressure finger 22, is also lifted to enlarge the gap 31 between valve housing 21 and piston surface 27 for the air to escape. Further details are hereafter described in connection with FIG. 9.

To provide adjustability to different measuring regions, the lever arm distance of the piston 20 with the pin or finger 22 can be adjustably varied relative to the pivot point 16. For this purpose the upper part of the valve housing is slidably guided on a bar or rail 32, and the desired position can be secured through a clamping screw 33 appearing in FIG. 6.

The test specimen 1 rests on a knife edge 34 in or near the middle line of the test specimen which edge runs parallel to the bent arm parts of the quartz glass rods 11 and 12. The knife edge 34, as is clearly evident from FIG. 6, is secured on the upper end of a post 35 provided at its lower end with a screw thread, so that the post can be raised and lowered, after the fashion of a spindle, through a positioning wheel nut 36 likewise having its rim projecting partly from the housing 8. Through rotation of the adjustment wheel 36, corresponding to the consequent raising and lowering of the specimen relative to the housing and also to the quartz rods 11 and 12, the location depth of these in relation to the surface 2, that is, the measuring depth, is established.

For guiding the knife edge 34 formed as a support for the test specimen and also for preventing rotation of the specimen, the knife edge further has a guide rod 36a slideably engaged through the housing cover 9. Running out at right angles from the knife edge 34 there is disposed an outrigger arm 37 having at its outer end a guiding piece element 38 for the lower edge and in particular the side margin of the test body. The positioning of this element in its contact on the test specimen is secured through a screw 39.

The testing of a specimen results in the following manner. First the beam portion or arm 14a of the measuring beam projecting from the housing is lifted by hand and thereby the upper angular end of the probe 12a is displaced outwardly in the direction indicated by the arrows 29. Then the test specimen is inserted from the front and the measuring beam is released. Thereby the probe 12 rests lightly against the test body. Finally the test specimen is raised or lowered through rotation of the hand wheel 36 to a position corresponding to the desired measuring depth, until the bent ends of the support 11 and of the probe 12 touch the specimen at the desired measuring level. The adjustment to the desired measuring level results through raising or lowering of the supporting knife edge of the test specimen through the hand wheel 36. A rapid and exact adjustment of the desired measuring level is possible by means of a measuring gauge, which, as represented in FIG. 8, is laid on the bent ends of the quartz rods 11 and 12. The contact on the quartz glass rod part 11a occurs at an extended surface, that on the quartz glass rod part 12a however at a knife edge, therefore on the whole being supported after the fashion of a tripod. The adjustment is achieved through a measuring gauge, which contacts the top side of the specimen by a feeler (not shown).

Finally an electric oscillating vane air pump 40, schematically represented in FIG. 9, is turned on. This is connected with an air pressure recorder 41, with a pressure gauge 42 and with the test device. Also there is included an excess pressure valve. Then the zero point is adjusted at the test device, in order to obtain a constantly identical starting value because of the high measurement sensitivity of the measuring device. For this purpose the hand wheel 17 is used, whereby corresponding to a right or left hand rotation, the measuring beam 14 with the rigidly secured probe 12 is raised or lowered only the required slight amount, often a fraction of a millimeter. Simultaneously therewith the piston 20 is raised and lowered, whereby the valve gap width 31 is changed. The hand wheel 17 is actuated a sufficient amount until an excess air pressure is established, equal for all experiments, at the pressure gauge and the air pressure recorder. This value before heating is the zero or starting value for the expansion measurements. The device of the described type measures the air escape and consequently the pressure drop. With the bent ends of the rods 11 and 12 at similar height levels, the arrangement is ready for the testing operations.

The pump 40 continually provides a uniform air stream through the gap 31. Each ever so slight change of position of the moveable pin 22 at the piston 20 immediately causes in respect to the change in the gap width 31 a pressure variation at the pressure gauge and also at the air pressure recorder. Next the heat source is turned on. As a heat source an acetylene burner with a self actuated air intake has proven advantageous. In the gas line between the burner 43 and the acetylene tank 44 there is built in an electric magnetic valve 45, the electric leads 46 of which are connected in parallel with the synchronous motor of the air pressure recorder to a current circuit 47. Through actuation of one switch, at the same instant the gas feed and the recorder transport begin. At the burner mouthpiece there is located a continually burning pilot flame resulting in an immediate ignition of the gas. A simultaneous turning on of the heat source and of the paper advance at the switch is required in order that no part of the curve be suppressed, or be prematurely recorded because of the immediate onset of sand surface expansion.

As an ignition device for the gas burner in place of a continually burning pilot flame, an electromagnetic igniter can be used coupled with the current circuit of the magnetic valve and of the motor of the recording apparatus. At the starting instant, through the attraction of an electromagnet, a friction surface drawn beneath a flint produces a spark. The further course of the investigation proceeds automatically.

With the expansion of the mold sand surface and the side movement of the probe 12 in the indicated arrow direction 29a and the tipping of the measuring beam 14a, there follows the lifting of the valve piston 20, so that the gap 31 is widened very slightly. Thereby in the air supply line there appears a pressure decrease which is observable at the manometer and is registered at the pressure recorder. The air pressure decrease is proportional to the excursion of the probe 12 and therefore to the expansion of the sand in the given measurement region.

To enable testing also of circular discs, for example, of a thickness of about 5 mm., there is used a specimen holder not represented in its details, which is comprised of a cylindrical base plate with two feet having a table plate in the form of a wire grid or net, on which the test specimen is laid.

I claim:

1. An apparatus for determining the thermal expansion of industrial materials such as molding and core sands and other refractory materials, comprising:
   a housing having a cover, means for supporting a test specimen above the cover,
   a quartz glass rod extending vertically from and firmly secured in said cover and bent at a right angle at its upper end to form a backing element for the test specimen,
   a probe element comprised of a similarly bent quartz glass rod with an elongated shaft freely movably vertically extending through an opening in the cover,
   a fulcrumed measuring beam in the housing, the lower end of the probe shaft being connected to one end of said measuring beam, the opposite end of the measuring beam projecting out of the housing, and beam displacement sensing means connected with said beam.

2. Apparatus in accordance with claim 1, wherein said sensing means includes a valve piston in contact with said beam and axially slidable in an air valve housing, said valve piston having a head permitting air entering the valve to escape exteriorly through a valve opening variable by beam displacement corresponding to specimen expansion during the duration of a test, an air pressure responsive recorder with constant chart paper drive, and an air supply line to said valve in communication with said recorder whereby pressure differences arising in the air supply line through variations in valve opening are transmitted to the recorder.

3. Apparatus in accordance with claim 2, wherein the valve piston in the region of the air inlet into the valve housing has a circumferentially running groove, of uniform depth over the length of the groove, and the head of the piston extends into an exteriorly open space of the valve housing of a greater inner diameter than the piston diameter.

4. An apparatus in accordance with claim 2, wherein the valve housing is displaceable along the length of the measuring beam and secureable at a selected position.

5. Apparatus in accordance with claim 1, wherein a fulcrum for said beam is vertically displaceable through an adjusting wheel having a threaded spindle engaged in a portion of the housing.

6. An apparatus in accordance with claim 1, with the support means for the specimen comprised of a knife edge element disposed above said cover and extending parallel to the bent ends of the backing and probe rods, said knife edge being aptly disposed to engage the bottom end of a specimen near its center line.

7. An apparatus in accordance with claim 6, wherein the specimen-supporting knife edge is vertically adjustably disposed relative to the housing and to the backing and probe rods.

8. An apparatus in accordance with claim 7, wherein the specimen-supporting knife edge is carried on a post, a lower post end being formed as a threaded spindle vertically adjustably moveably supported in the housing through an adjusting wheel partly projecting from the housing.

9. Apparatus in accordance with claim 6, including a specimen side edge guide releasably secured at variable selectable distances from the knife edge.

10. Apparatus in accordance with claim 2, including an electric oscillating vane pump supplying said air.

11. Apparatus in accordance with claim 2, including a gas burner for heating said specimen, an electro-magnetic valve disposed in a burner gas supply line, and electric circuit means for said electro-magnetic valve and for a paper drive of said recorder, said electro-magnetic valve set to "on" condition upon turning on of the current for the air pressure recorder chart drive through a single switch.

12. A method for determining the thermal expansion of industrial materials, especially rigidified high heat molding sands and cores as well as other refractory structural materials, therein characterized, that a test specimen is supported in a manner permitting its unhindered expansion, and is strongly heated on one side, and the amount of expansion of the heated sub-surface zone is measured in comparison to that of the zones less heated or unheated because of distance from the heated surface.

13. A method in accordance with claim 12, therein characterized, that the amount of the expansion is measured at different distances from the heated side surface.

14. A method in accordance with claim 13, therein characterized, that a cylindrical test specimen is used and heated on one end surface, and wherein the radially directed expansion is transmitted to a probe making point contact with the specimen, and the excursion of the probe is measured.

15. A method in accordance with claim 14, wherein the test specimen is backed by a point-contacting support disposed oppositely to, and at a distance from the heated surface like to that of, the probe, quartz glass rods being used as the material for the support and probe.

16. A method in accordance with claim 14, wherein the probe excursion is transmitted through a lever rod to the piston of an air valve constantly supplied with an air stream, and a change of the supply air pressure in consequence of the piston-varied effective valve air escape area is recorded on an air pressure recorder having an advancing paper chart.

17. A method in accordance with claim 16, therein characterized, that with a constant air stream supplied to the valve, the one-sided heating of the specimen and the advance of the chart of the air pressure recorder are started simultaneously.

References Cited by the Examiner
UNITED STATES PATENTS

| | | | |
|---|---|---|---|
| 2,380,565 | 7/1945 | Wetherbee | 73—16 |
| 3,159,018 | 12/1964 | Patterson et al. | 73—15.6 |
| 3,182,486 | 5/1965 | Patterson et al. | 73—16 |

RICHARD C. QUEISSER, *Primary Examiner.*

J. C. GOLDSTEIN, *Assistant Examiner.*

UNITED STATES PATENT OFFICE
CERTIFICATE OF CORRECTION

Patent No. 3,295,358                            January 3, 1967

Dietmar Boenisch

It is hereby certified that error appears in the above numbered patent requiring correction and that the said Letters Patent should read as corrected below.

Column 5, lines 5 and 6, strike out "comprised of including a housing or chamber 8, a cover 9" and insert instead -- comprised of a housing or chamber 8, including a housing cover 9 --; line 41, for "base line 29" read -- hose line 29 --; line 43, for "probe 12d" read -- probe 12a --; line 46, for "beam portion 14d" read -- beam portion 14a --.

Signed and sealed this 26th day of September 1967.

(SEAL)
Attest:

ERNEST W. SWIDER                                      EDWARD J. BRENNER
Attesting Officer                                           Commissioner of Patents